(12) United States Patent
Chen et al.

(10) Patent No.: US 12,445,234 B2
(45) Date of Patent: Oct. 14, 2025

(54) METHOD, APPARATUS, AND TERMINAL FOR FEEDING BACK HARQ-ACK INFORMATION

(71) Applicant: VIVO MOBILE COMMUNICATION CO., LTD., Guangdong (CN)

(72) Inventors: Xiaohang Chen, Guangdong (CN); Chaojun Zeng, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 4 days.

(21) Appl. No.: 18/415,124

(22) Filed: Jan. 17, 2024

(65) Prior Publication Data

US 2024/0154736 A1    May 9, 2024

Related U.S. Application Data

(63) Continuation of application No. PCT/CN2022/107458, filed on Jul. 22, 2022.

(30) Foreign Application Priority Data

Jul. 23, 2021    (CN) .......................... 202110839692.9

(51) Int. Cl.
H04L 1/1867    (2023.01)
H04L 1/1829    (2023.01)

(52) U.S. Cl.
CPC .......... *H04L 1/1893* (2013.01); *H04L 1/1861* (2013.01); *H04L 1/1864* (2013.01); *H04L 1/1896* (2013.01)

(58) Field of Classification Search
CPC ... H04L 1/1893; H04L 1/1861; H04L 1/1864; H04L 1/1896; H04L 5/001; H04L 5/0055
See application file for complete search history.

(56) References Cited

U.S. PATENT DOCUMENTS

2018/0278373 A1*  9/2018  Wang et al. .......... H04L 5/0055
2019/0261361 A1   8/2019  Xiong et al.
(Continued)

FOREIGN PATENT DOCUMENTS

CN    111585728 A    8/2020
CN    111601339 A    8/2020
(Continued)

OTHER PUBLICATIONS

China Telecom, "Discussion on two aspects of UE HARQ-ACK feedback enhancements", 3GPP TSG RAN WG1 #105-e, R1-2104854, e-Meeting, May 10-27, 2021.

(Continued)

*Primary Examiner* — Edan Orgad
*Assistant Examiner* — Samuel Roberge Bettendorf
(74) *Attorney, Agent, or Firm* — Price Heneveld LLP

(57) ABSTRACT

This application discloses a method, an apparatus, and a terminal for feeding back HARQ-ACK information. The method for feeding back HARQ-ACK information according to embodiments of this application includes: A terminal determines, when N carriers are configured, a second hybrid automatic repeat request acknowledgement HARQ-ACK feedback resource based on a first HARQ-ACK feedback resource and the N carriers; and the terminal transmits HARQ-ACK information based on the second HARQ-ACK feedback resource, where the first HARQ-ACK feedback resource is determined according to a network indication, $N \geq 2$, and N is an integer.

13 Claims, 7 Drawing Sheets

(56) References Cited

U.S. PATENT DOCUMENTS

| | | |
|---|---|---|
| 2020/0322120 A1 | 10/2020 | Yang et al. |
| 2020/0351025 A1 | 11/2020 | Choi et al. |
| 2022/0085925 A1 | 3/2022 | Gao |
| 2022/0174709 A1 | 6/2022 | Chen et al. |
| 2023/0118350 A1* | 4/2023 | Bang et al. ........... H04L 1/1854 370/329 |
| 2023/0336281 A1* | 10/2023 | Mu ....................... H04L 1/1822 |

FOREIGN PATENT DOCUMENTS

| | | | | |
|---|---|---|---|---|
| CN | 111835489 A | | 10/2020 | |
| CN | 112219367 A | * | 1/2021 | ........... H04L 1/1854 |
| KR | 20210103901 A | * | 8/2021 | ........... H04L 1/1812 |
| WO | 2020110244 A1 | | 6/2020 | |

OTHER PUBLICATIONS

NEC, "UE feedback enhancements for HARQ-ACK", 3GPP TSG RAN WG1 #105-e, R1-2105258, e-Meeting, May 10-27, 2021.

\* cited by examiner

200

A terminal determines, when N carriers are configured, a second HARQ-ACK feedback resource based on a first HARQ-ACK feedback resource and the N carriers — S210

The terminal transmits HARQ-ACK information based on the second HARQ-ACK feedback resource — S220

METHOD, APPARATUS, AND TERMINAL FOR FEEDING BACK HARQ-ACK INFORMATION

CROSS-REFERENCE TO RELATED APPLICATIONS

The present invention is a Bypass continuation application of PCT International Application No. PCT/CN2022/107458 filed on Jul. 22, 2022, which claims priority to Chinese Patent Application No. 202110839692.9 entitled "METHOD, APPARATUS, AND TERMINAL FOR FEEDING BACK HARQ-ACK INFORMATION" filed with the China National Intellectual Property Administration on Jul. 23, 2021, which are incorporated in their entireties by reference herein.

TECHNICAL FIELD

This application relates to the field of wireless communication technologies, and in particular, to a method, an apparatus, and a terminal for feeding back HARQ-ACK information.

BACKGROUND

In a new radio (NR) system, when scheduling downlink transmission, a base station may adopt dynamic scheduling or semi-persistent scheduling. By using semi-persistent scheduling (SPS) as an example, a hybrid automatic repeat request acknowledgment (HARQ-ACK) feedback time of each semi-persistent scheduling (SPS) configuration is indicated by respective activated downlink control information (DCI). Therefore, HARQ-ACK information corresponding to physical downlink shared channels (PDSCH) of different SPS configurations may be fed back at different HARQ-ACK feedback times.

However, if a feedback resource of HARQ-ACK information corresponding to a PDSCH conflicts with a downlink (DL) resource, the HARQ-ACK information is discarded, resulting in a degradation in the performance of the SPS PDSCH.

SUMMARY

Embodiments of this application provide a method, an apparatus, and a terminal for feeding back HARQ-ACK information.

According to a first aspect, a method for feeding back HARQ-ACK information is provided. The method includes: A terminal determines, when N carriers are configured, a second hybrid automatic repeat request acknowledgement HARQ-ACK feedback resource based on a first HARQ-ACK feedback resource and the N carriers; and the terminal transmits HARQ-ACK information based on the second HARQ-ACK feedback resource, where the first HARQ-ACK feedback resource is determined according to a network indication, $N \geq 2$, and N is an integer.

According to a second aspect, an apparatus for feeding back HARQ-ACK information is provided. The apparatus includes: a determining module, configured to determine, when N carriers are configured, a second hybrid automatic repeat request acknowledgement HARQ-ACK feedback resource based on a first HARQ-ACK feedback resource and the N carriers; and a transmission module, configured to transmit, HARQ-ACK information based on the second HARQ-ACK feedback resource, where the first HARQ-ACK feedback resource is determined according to a network indication, $N \geq 2$, and N is an integer.

According to a third aspect, a terminal is provided. The terminal includes a processor, a memory, and a program or instructions stored in the memory and runnable on the processor, the program or the instructions, when executed by the processor, implementing the steps of the method according to the first aspect.

According to a fourth aspect, a terminal is provided, including a processor and a communication interface, where the communication interface is coupled to the processor, and the processor is configured to run a program or instructions to implement the steps of the method according to the first aspect.

According to a fifth aspect, a non-transitory readable storage medium is provided, storing a program or instructions, the program or the instructions, when executed by a processor, implementing the steps of the method according to the first aspect.

According to a sixth aspect, a chip is provided, where the chip includes a processor and a communication interface, the communication interface is coupled to the processor, and the processor is configured to run a program or instructions to implement the steps of the method according to the first aspect.

According to a seventh aspect, a computer program product/program product is provided, where the computer program/program product is stored in a non-transient storage medium, and the program/program product is executed by at least one processor to implement the steps of the method according to the first aspect.

According to an eighth aspect, an electronic device is provided, configured to perform the steps of the method according to the first aspect.

DETAILED DESCRIPTION

The technical solutions in embodiments of this application are clearly described below with reference to the accompanying drawings in embodiments of this application.

Apparently, the described embodiments are some rather than all of embodiments of this application. All other embodiments obtained by a person of ordinary skill in the art based on the embodiments of this application fall within the protection scope of this application.

The specification and claims of this application, and terms "first" and "second" are used to distinguish similar objects, but are not used to describe a specific sequence or order. It is to be understood that the terms termed in this way are interchangeable in a proper case, so that the embodiments of this application can be implemented in other orders than the orders illustrated or described herein. Moreover, the objects distinguished by "first" and "second" are usually of one type, and the quantity of objects is not limited. For example, there may be one or more first objects. In addition, "and/or" in the description and claims represents at least one of connected objects, and the character "/" generally indicates an "or" relationship between associated objects.

It should be noted that the technologies described in embodiments of this application are not limited to a long term evolution (LTE)/LTE-advanced (LTE-A) system, and may be further applied to other wireless communication systems such as Code Division Multiple Access (CDMA), Time Division Multiple Access (TDMA), Frequency Division Multiple Access (FDMA), Orthogonal Frequency Division Multiple Access (OFDMA), Single Carrier Frequency Division Multiple Access (SC-FDMA), and other systems. The terms "system" and "network" may be used interchangeably in embodiments of this application. The technology described can be applied to the systems and radio technologies described above, and can also be applied to other systems and radio technologies. The following description describes a new radio (NR) system for illustrative purposes, and NR terminology is used in most of the description below. These technologies are also applicable to applications other than NR system applications, for example, the $6^{th}$ generation (6G) communication system.

Figures 1, 2:
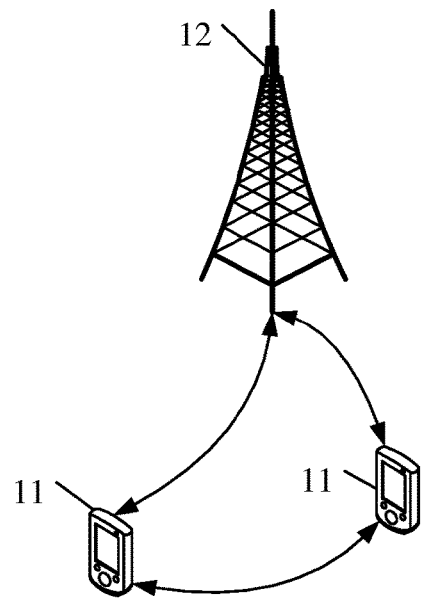
FIG. 1 is a schematic structural diagram of a wireless communication system according to an example embodiment of this application.
FIG. 2 is a schematic flowchart of a method for feeding back HARQ-ACK information according to an example embodiment of this application.

FIG. 1 is a schematic structural diagram of a wireless communication system to which an embodiment of this application can be applied. The communication system includes a terminal 11 and a network side device 12. The terminal 11 may be alternatively referred to as a terminal device or user equipment (UE). The terminal 11 may be a terminal side device such as a mobile phone, a tablet personal computer, a laptop computer or referred to as a notebook computer, a personal digital assistant (PDA), a palmtop computer, a netbook, an ultra-mobile personal computer (UMPC), a mobile Internet device (MID), a wearable device, vehicle user equipment (VUE), or pedestrian user equipment (PUE). The wearable device includes: smartwatches, bracelets, earphones, glasses, and the like. It should be noted that in embodiments of this application, a specific type of the terminal 11 is not limited. The network side device 12 may be a base station or a core network, where the base station may be referred to as a Node B, an evolved Node B, an access point, a base transceiver station (BTS), a radio base station, a radio transceiver, a basic service set (BSS), an extended service set (ESS), a Node B, an evolved Node B (eNB), a Home Node B, a Home evolved Node B, a wireless local area network (WLAN) access point, a Wi-Fi Node, a transmitting receiving point (TRP), or another suitable term in the field. As long as the same technical effect is achieved, the base station is not limited to a specific technical vocabulary. It should be noted that, only a base station in an NR system is used as an example in the embodiments of this application, and the specific type of the base station is not limited.

A technical solution provided in embodiments of this application is described in detail below with reference to the accompanying drawings by using some embodiments and application scenarios.

FIG. 2 is a schematic flowchart of a method 200 for feeding back HARQ-ACK information according to an example embodiment of this application. The method 200 may be, but is not limited to, performed by a terminal, and specifically may be performed by hardware and/or software installed in the terminal. In this embodiment, the method 200 may include at least the following steps.

S210: A terminal determines, when N carriers are configured, a second HARQ-ACK feedback resource based on a first HARQ-ACK feedback resource and the N carriers.

In this embodiment, the terminal works in a carrier aggregation (CA) scenario, and the network side configures the terminal with N (where N≥2, and N is an integer) carriers. Uplink (UL) resources (for example, physical uplink control channel (PUCCH) resources) may be configured on only some of the N carriers. For example, in the N carriers configured for the terminal, uplink PUCCH resources may be configured on M (M N) carriers. In this case, the network side may be configured to turn on a PUCCH carrier switching mode, so that the terminal may perform switching on M carriers equipped with PUCCH resources, to achieve feedback of HARQ-ACK information. It should be noted that a time division duplex (TDD) configuration or slot format of each carrier described in this embodiment and subsequent embodiments can be implemented by protocol agreement or network configuration.

In addition, the first HARQ-ACK feedback resource may be determined according to a network indication. For example, it is assumed that the terminal is equipped with at least one DL SPS configured resource on a carrier CC1, such as SPS config 1 to L, and the terminal receives an SPS PDSCH of an SPS config j in a slot n. In this case, according to an activated DCI indication of the SPS config j, HARQ-ACK information corresponding to the SPS PDSCH is to be fed back on a slot n+k. That is, the first HARQ-ACK feedback resource determined according to the network indication is the slot n+k, where k is determined according to the DCI indication and may be 2 or the like.

Certainly, in a possible implementation, the terminal may perform, when detecting that the first HARQ-ACK feedback resource conflicts with a DL resource of the N carriers, the step of determining the second HARQ-ACK feedback resource based on the first HARQ-ACK feedback resource and the N carriers. That "the first HARQ-ACK feedback resource conflicts with the DL resource of the N carriers" may be understood as follows: Some or all of the symbols occupied by PUCCH resources determined within the first HARQ-ACK feedback time (slot n+k) for carrying the HARQ-ACK information conflict with DL (including a DL symbol, SSB, CORESET #0, and the like) symbols. Certainly, for the conflict problem, in this embodiment, the HARQ-ACK information may be postponed to a subsequent time (for example, any time after the first HARQ-ACK feedback time) for feedback, and the second HARQ-ACK feedback resource carrying the HARQ-ACK information may be located on any of the N carriers equipped with the UL resource, thereby achieving normal feedback of the HARQ-ACK information.

Alternatively, when the terminal receives resource indication information sent by the network side (for example, indication information for scheduling new transmission or indication information for scheduling retransmission), the terminal may perform the step of determining the second HARQ-ACK feedback resource based on the first HARQ-ACK feedback resource and the N carriers. This is not limited in this embodiment.

S220: The terminal transmits HARQ-ACK information based on the second HARQ-ACK feedback resource.

The second HARQ-ACK feedback resource is determined through resource re-selection, and the second HARQ-ACK feedback resource obtained through re-selection may be determined at the first HARQ-ACK feedback time or any time after the first HARQ-ACK feedback time, and is an available UL resource configured on any carrier on the N carriers, for example, a PUCCH resource. It may be understood that the available UL resource described in this embodiment and subsequent embodiments refers to sufficient uplink resources on the carrier or the time unit for transmitting a PUCCH, and the PUCCH includes the HARQ-ACK information corresponding to the SPS PDSCH, and may further include other uplink control information (UCI). Alternatively, the available UL resource refers to sufficient uplink resources on the carrier or the time unit for transmitting a PUSCH, where the PUSCH is a dynamically scheduled or semi-statically configured PUSCH, and the UCI (including HARQ-ACK of the SPS PDSCH) is to be multiplexed and transmitted on the PUSCH.

Optionally, the HARQ-ACK information may refer to HARQ-ACK information corresponding to a special PDSCH, or may generally refer to HARQ-ACK information corresponding to a PDSCH for which HARQ-ACK needs to be fed back. In addition, the HARQ-ACK information may refer to HARQ-ACK data information or HARQ-ACK codebook information, such as type 1/2/3 codebook.

In this embodiment, the method of determining the second HARQ-ACK feedback resource based on the first HARQ-ACK feedback resource and the N carriers by the terminal achieves the purpose of reselecting the HARQ-ACK feedback resource on the N carriers, and then the HARQ-ACK information can be transmitted by the terminal based on the reselected HARQ-ACK feedback resource. This not only effectively avoids the problem that the HARQ-ACK information is discarded due to the conflict between the HARQ-ACK feedback resource and the DL resource, but also improves the performance of the SPS PDSCH and the utilization of the UL resource on the N carriers.

Figure 3:
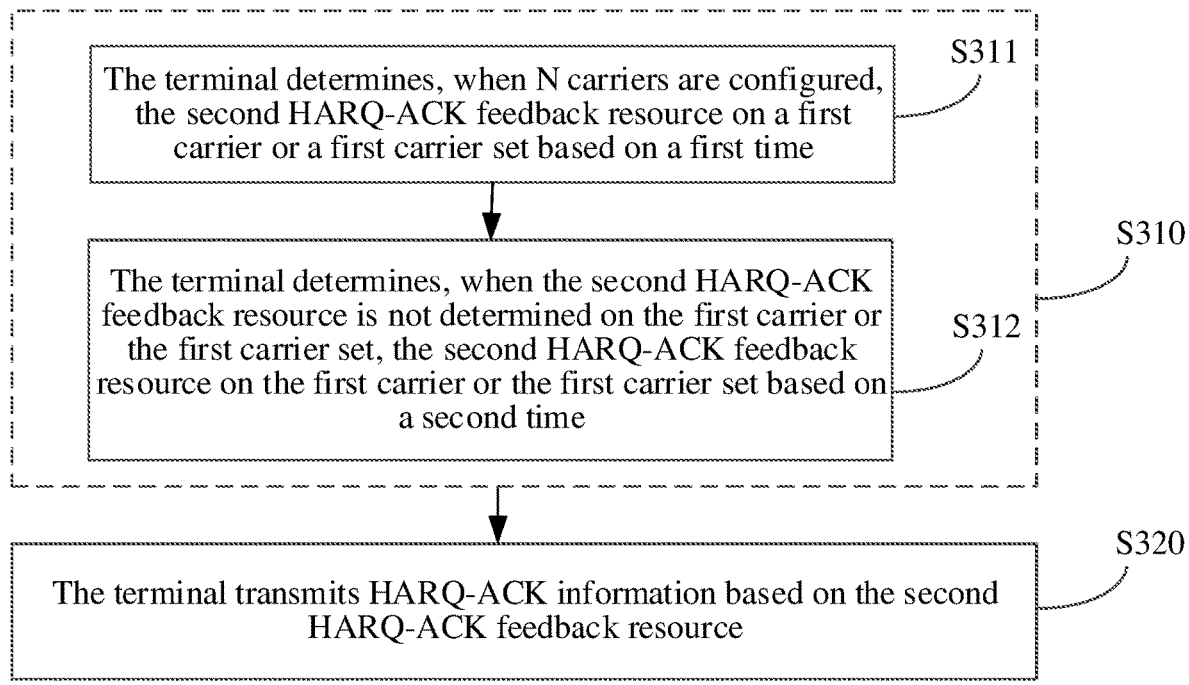
FIG. 3 is a schematic flowchart of a method for feeding back HARQ-ACK information according to another example embodiment of this application.

FIG. 3 is a schematic flowchart of a method 300 for feeding back HARQ-ACK information according to an example embodiment of this application. The method 300 may be, but is not limited to, performed by a terminal, and specifically may be performed by hardware and/or software installed in the terminal. In this embodiment, the method 300 may include at least the following steps.

S310: A terminal determines, when N carriers are configured, a second HARQ-ACK feedback resource based on a first HARQ-ACK feedback resource and the N carriers. N≥2, and N is an integer.

It may be understood that for the implementation process of S310, in addition to referring to the relevant description in the method embodiment 200, in a possible implementation, the terminal may determine the second HARQ-ACK feedback resource based on the first HARQ-ACK feedback resource and the N carriers in various manners. For example, refer to FIG. 3 again. The implementation process of S310 may further include S311 and/or S312, as follows.

S311: The terminal determines, when N carriers are configured, the second HARQ-ACK feedback resource on a first carrier or a first carrier set based on a first time.

The first time is determined based on the first HARQ-ACK feedback resource. For example, when the first HARQ-ACK feedback resource includes a first HARQ-ACK feedback time, the first time may be the first HARQ-ACK feedback time, or may be any time after the first HARQ-ACK feedback time.

For example, it is assumed that the first time is the first HARQ-ACK feedback time, and the first HARQ-ACK feedback time is a time unit j determined based on activated DCI, where j=n+k. In this case, the terminal may first determine the first carrier or the first carrier set on the time unit j, search for an available UL resource on the first carrier and the first carrier set, and then determine the available UL resource as the second HARQ-ACK feedback resource. It should be noted that when determining the first carrier or the first carrier set, if there are a plurality of carriers, the first carrier or the first carrier set may be selected according to carrier numbers, for example, from small to large (or from large to small).

Alternatively, it is assumed that the first time is any time after the first HARQ-ACK feedback time, and the first HARQ-ACK feedback time is a time unit j determined based on activated DCI, where j=n+k. In this case, the first time is j+a; and the terminal may first determine the first carrier or the first carrier set on the time unit j+a, search for an available UL resource on the first carrier and the first carrier set, and then determine the available UL resource as the second HARQ-ACK feedback resource.

Further, the first carrier belongs to the N carriers, for example, the first carrier may be any one of the N carriers. Optionally, in this embodiment, the first carrier may include at least one of the following (11) to (17).

(11) A carrier with the smallest number in the N carriers.

(12) A carrier with the highest number in the N carriers.

(13) A carrier determined based on a PUCCH cell timing pattern.

The PUCCH cell timing pattern may be implemented through protocol agreement, high-level configuration, network configuration, or the like. In this embodiment, the terminal is equipped with one or more PUCCH cell timing patterns to indicate whether each carrier is allowed to be used. For example, the PUCCH cell timing pattern may indicate carriers that are available or unavailable within a period of time, times at which each carrier is available, times at which each carrier is unavailable, and the like. In addition, usage information of PUCCH carriers indicated by different cells and different PUCCH cell timing patterns may be the same or different.

In an implementation, the first carrier or the first carrier set determined by the terminal based on the PUCCH cell timing pattern may be a carrier corresponding to a current time unit in the PUCCH cell timing pattern.

(14) A carrier that receives a PDSCH.

The PDSCH corresponds to the HARQ-ACK information. Optionally, the PDSCH may be an SPS PDSCH, or the like.

(15) An uplink transmission carrier of the network indication.

For example, the network indication may be a DCI indication, and the uplink transmission carrier may be a carrier that transmits a PUSCH, or a carrier that transmits a PUCCH.

(16) A main carrier.

For example, the main carrier may be a carrier corresponding to a primary serving cell (PCell), or a carrier corresponding to a primary serving cell of a secondary cell group (PScell).

(17) A subcarrier.

For example, the subcarrier is a carrier corresponding to a secondary serving cell (SCell).

Further, the first carrier set may also include at least one of the following (21) to (26).

(21) At least some of the N carriers.

The at least some of the carriers may be a first quantity of carriers with higher numbers in the N carriers, or a second quantity of carriers with lower numbers in the N carriers, or may be even-numbered carriers in the N carriers, or the like. The first quantity and the second quantity may be implemented through protocol agreement, high-level configuration, or the like. This is not limited herein

(22) A carrier determined based on a PUCCH cell timing pattern.
(23) A carrier that receives a PDSCH, where the PDSCH corresponds to the HARQ-ACK information.
(24) An uplink transmission carrier indicated by DCI.
(25) A main carrier.
(26) A subcarrier.

For an implementation process of (22) to (26), refer to the relevant descriptions in (11) to (17) above. To avoid repetition, details are not described herein again.

It should be noted that the time unit described in this embodiment and subsequent embodiments may be a sub-slot, a slot, a symbol, a subframe, a frame, millisecond (ms), seconds (s), or the like. This is not limited herein.

Further, in a possible implementation, assuming that the terminal determines the second HARQ-ACK feedback resource on the first carrier set based on the first time, terminal may sequentially determine the second HARQ-ACK feedback resource on each carrier included in the first carrier set according to a number sequence of each carrier included in the first carrier set.

For example, it is assumed that the first time is the first HARQ-ACK feedback time, and the first HARQ-ACK feedback time is a time unit j determined based on activated DCI, where j=n+k. In this case, based on the time unit j, in the first carrier set, the terminal may sequentially search for an available UL resource on each carrier in the first carrier set in ascending or descending order of carrier numbers as the second HARQ-ACK feedback resource.

S312: The terminal determines, when the second HARQ-ACK feedback resource is not determined on the first carrier or the first carrier set, the second HARQ-ACK feedback resource on the first carrier or the first carrier set based on a second time, where the second time is later than the first time. For example, when the first time is the time unit j=n+k, the second time may be j=n+k+1, j=n+k+2, j=n+k+3, or the like.

In a possible implementation, assuming that the first time is the time unit j, but the terminal does not determine the second HARQ-ACK feedback resource on the first carrier or the first carrier set based on the time unit j, the terminal may continue to determine the second HARQ-ACK feedback resource on the first carrier or the first carrier set based on a time unit j+1, and repeat this until the second HARQ-ACK feedback resource is determined on the first carrier or the first carrier set.

Certainly, to improve communication efficiency, the second time may be determined according to the maximum delay time. For example, the second time may be the same as the maximum delay time or the second time may be a sum of the first HARQ-ACK feedback time and the maximum delay time. In this embodiment, the maximum delay time $K_{Def}$ may be set through protocol agreement, high-level configuration, or the like.

In this case, when the second HARQ-ACK feedback resource is not determined on the first carrier or the first carrier set by the terminal based on the second time but the second time is later than the first time and reaches the maximum delay time, that is, the second time is j+$K_{Def}$, the terminal may stop the step of determining the second HARQ-ACK feedback resource on the first carrier or the first carrier set.

Based on the foregoing descriptions of S311 and S312, the following describes the process of determining the second HARQ-ACK feedback resource by the terminal on the first carrier and the first carrier set in combination with Method 0 and Method 1 respectively.

Method 0

(1) The terminal determines the first carrier in the slot j (n+k, that is, the first time in S311), searches for an available UL resource on the first carrier, and determines the searched available UL resource as a feedback resource for HARQ-ACK information (namely, the second HARQ-ACK feedback resource).

2) If the terminal does not find an available UL resource in the slot j, the terminal repeats (1) in the slot j+1 (namely, the second time in S312) until an available UL resource is found or the maximum delay time is reached, that is, j=n+k+KDef, and then stops searching for an available UL resource.

Method 1

(1) The terminal searches for an available UL resource in the first carrier set in ascending or descending order of carrier numbers starting from the slot j (n+k, that is, the first time in S311), and determines the searched available UL resource as a feedback resource for HARQ-ACK information (namely, the second HARQ-ACK feedback resource).

(2) If the terminal does not find an available UL resource in the slot j in the first carrier set, the terminal repeats (1) in the slot j+1 (namely, the second time in S312) until an available UL resource is found or the maximum delay time is reached, that is, j=n+k+KDef, and then stops searching for an available UL resource.

S320: The terminal transmits HARQ-ACK information based on the second HARQ-ACK feedback resource.

It may be understood that for the implementation process of S320, refer to the relevant descriptions in the method embodiment 200. To avoid duplication, details are not described herein again.

Based on the method for feeding back HARQ-ACK information provided in this embodiment, such as the foregoing method 0 and method 1, the implementation process is further described below with examples.

Example 1

Figure 4A:
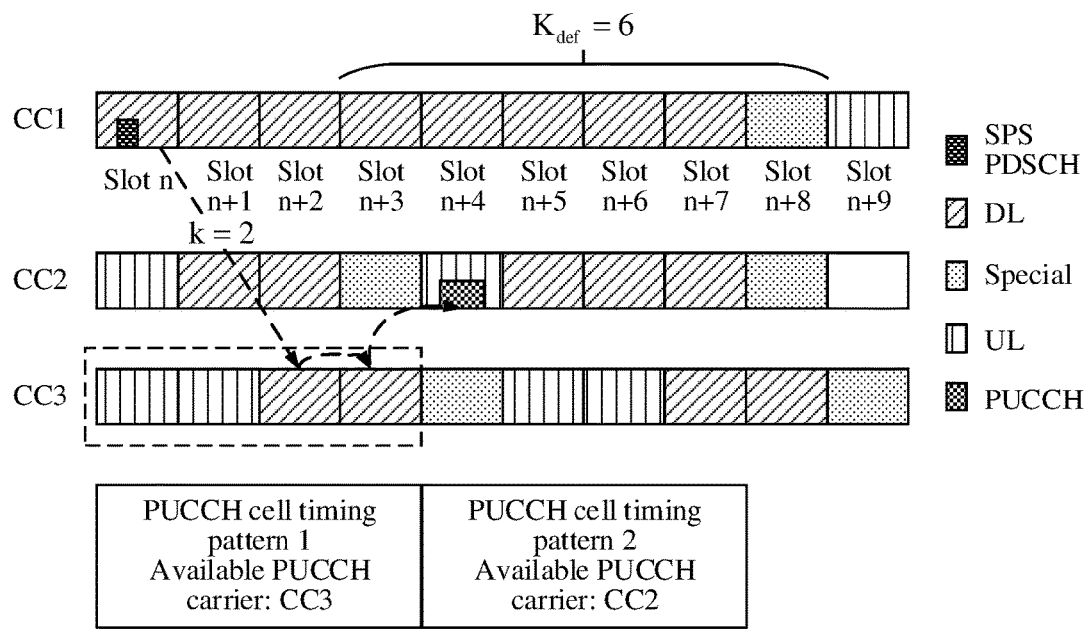
FIG. 4*a* to FIG. 4*g* are respectively schematic diagrams of different slot structures for feeding back HARQ-ACK information according to an example embodiment of this application.

As shown in FIG. 4a, assuming that the terminal receives an SPS PDSCH sent by the network side device on a carrier 1 (CC1) in a slot n, and according to a network indication (for example, activated DCI), a first HARQ-ACK feedback time of HARQ-ACK information corresponding to the SPS PDSCH is slot n+2 (k=2), a maximum delay time (that is, a delay time) of the HARQ-ACK of the SPS PDSCH is $K_{Def}$=6. In other words, the HARQ-ACK information corresponding to the SPS PDSCH can be postponed to a slot n+2+6 at most for feedback.

In addition, a PUCCH cell timing pattern 1 and a PUCCH cell timing pattern 2 are configured on the network side. The PUCCH cell timing pattern 1 corresponds to a slot n to a slot n+3, and a PUCCH carrier available in the pattern 1 (namely, the first carrier or the first carrier set) is a CC3. The PUCCH cell timing pattern 2 corresponds to a slot n+4 to a slot n+7, and a PUCCH carrier available in the pattern 2 is a CC2.

In this case, according to the foregoing method 0, the terminal may first determine the available UL resource for HARQ-ACK information (namely, the second HARQ-ACK feedback resource) in the slot n+2. Because the slot n+2 is in the PUCCH cell timing pattern 1, the terminal searches for an available UL resource on the corresponding available CC3. However, there is no available UL resource from the slot n+2 to the slot n+3 on the CC3. Therefore, the terminal searches for subsequent available UL resources on the available CC2 corresponding to the PUCCH cell timing pattern 2 starting from the slot n+4. If the terminal finds an available UL resource in the slot n+4 of the CC2, HARQ-ACK information can be transmitted based on the slot n+4.

Example 2

Figure 4B:
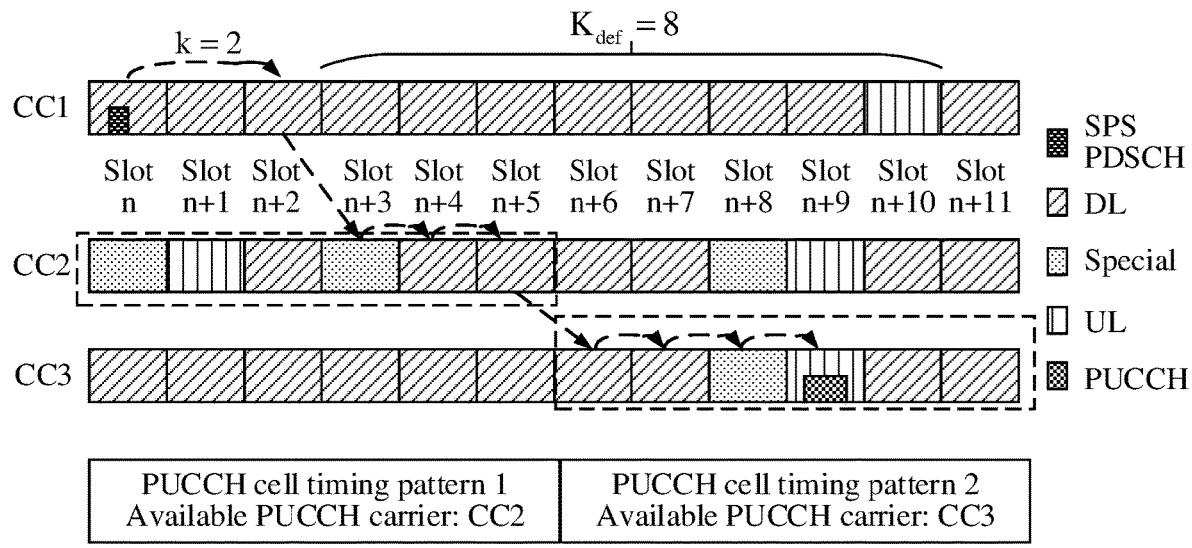

As shown in FIG. 4b, assuming that the terminal receives an SPS PDSCH sent by the network side device on a carrier 1 (CC1) in a slot n, and according to a network indication, a first HARQ-ACK feedback time of HARQ-ACK information corresponding to the SPS PDSCH is slot n+2 (k=2), a maximum delay time (that is, a delay time) of the HARQ-ACK of the SPS PDSCH is $K_{Def}$=8. In other words, the HARQ-ACK information corresponding to the SPS PDSCH can be postponed to a slot n+2+8 at most for feedback.

In addition, a PUCCH cell timing pattern 1 and a PUCCH cell timing pattern 2 are configured on the network side. The PUCCH cell timing pattern 1 corresponds to a slot n to a slot n+5, and a PUCCH carrier available in the pattern 1 is CC2. The PUCCH cell timing pattern 2 corresponds to a slot n+6 to a slot n+11, and a PUCCH carrier available in the pattern 2 is CC3.

In this case, according to the foregoing method 0, the terminal may search for an available UL resource on the carrier that receives the SPS PDSCH based on the slot n+2. However, because the slot n+2 conflicts with the DL resource on the carrier that receives the SPS PDSCH, the terminal searches for an available UL resource starting from the slot n+3 according to the PUCCH cell timing pattern.

Specifically, the slot n+3 is in the PUCCH cell timing pattern 1, so that the terminal searches for an available UL resource on a corresponding available PUCCH carrier 3. There is no available UL resource from the slot n+3 to the slot n+5 on the CC2. Therefore, the terminal searches for subsequent available UL resources on the available PUCCH carrier CC3 corresponding to the PUCCH cell timing pattern 2 starting from the slot n+6. Finally, in the slot n+9 of CC3, the terminal determines the slot n+9 as an available UL resource, and transmits the HARQ-ACK information.

Example 3

Figure 4C:
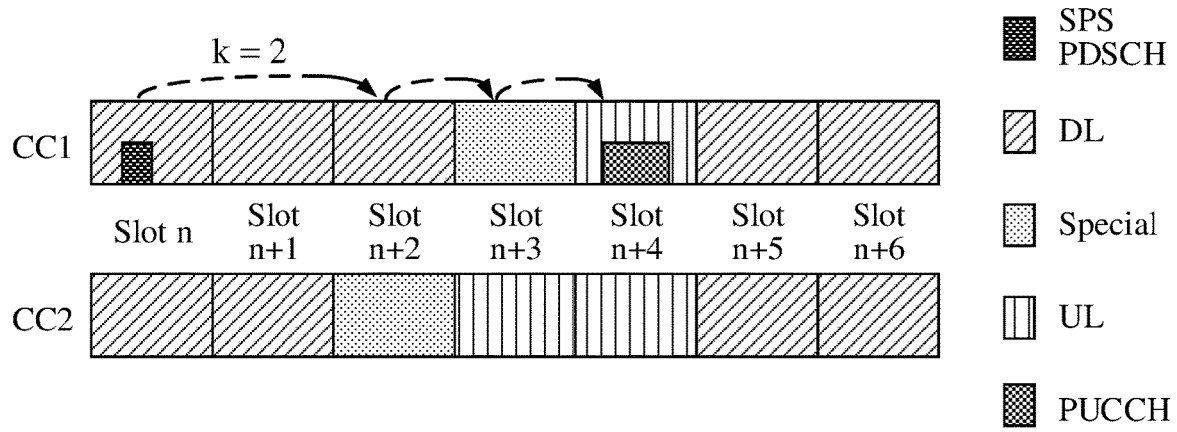

As shown in FIG. 4c, assuming that the terminal receives an SPS PDSCH sent by the network side device on a carrier 1 (CC1) in a slot n, and according to a network indication, a first HARQ-ACK feedback time of HARQ-ACK information corresponding to the SPS PDSCH is slot n+2 (k=2), a maximum delay time (that is, a delay time) of the HARQ-ACK of the SPS PDSCH is $K_{Def}$=6. In other words, the HARQ-ACK information corresponding to the SPS PDSCH can be postponed to a slot n+2+6 at most for feedback.

However, because the slot n+2 conflicts with the DL resource, the terminal postpones the HARQ-ACK information to subsequent UL resources. Based on this, according to the foregoing method 0, the terminal can search for subsequent available UL resources on the current carrier. If it is determined that the slot n+4 is an available UL resource, the terminal transmits the HARQ-ACK information in the slot n+4.

Example 4

Figure 4D:
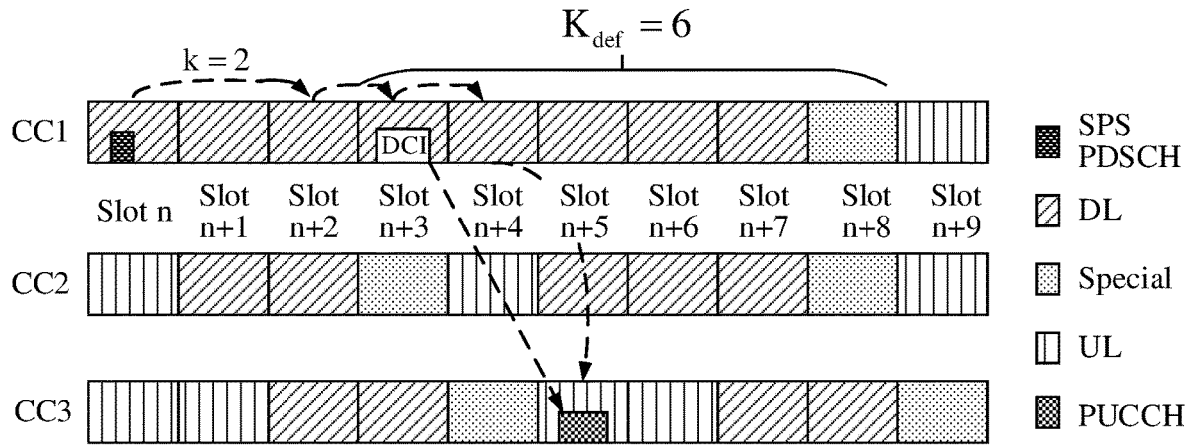

As shown in FIG. 4d, assuming that the terminal receives an SPS PDSCH sent by the network side device on a carrier 1 (CC1) in a slot n, and according to a network indication, a first HARQ-ACK feedback time of HARQ-ACK information corresponding to the SPS PDSCH is slot n+2 (k=2), a maximum delay time (that is, a delay time) of the HARQ-ACK of the SPS PDSCH is $K_{Def}$=6. In other words, the HARQ-ACK information corresponding to the SPS PDSCH can be postponed to a slot n+2+6 at most for feedback.

However, because the CC1 conflicts with the DL resource in the slot n+2, the UE re-determines the UL resource for HARQ-ACK information transmission.

Based on this, the network schedules the PUCCH in the slot n+5 of the CC3 through DCI in the slot 3. The PUCCH includes the HARQ-ACK information of the dynamically scheduled PDSCH. According to the foregoing method 0, the terminal may search for subsequent available UL resources on the CC1 (where the CC1 may be an SPS PDSCH receiving carrier, or a carrier corresponding to the PUCCH cell timing pattern, and this is not limited herein). There is no available UL resource in the slot n+2 to the slot n+4. Therefore, if the terminal is in the slot n+5, the CC3 indicated by DCI is switched to, and the slot n+5 is determined as an available UL resource. In this case, the HARQ-ACK information can be transmitted based on the available UL resource.

Example 5

Figure 4E:
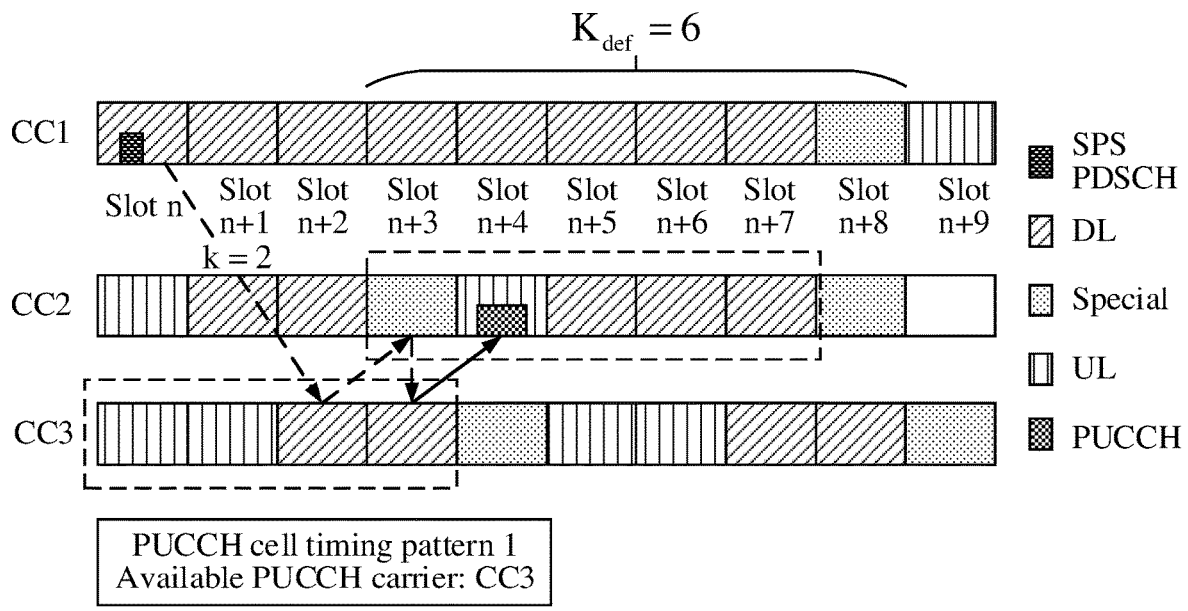

As shown in FIG. 4e, assuming that the terminal receives an SPS PDSCH sent by the network side device on a carrier 1 (CC1) in a slot n, and according to a network indication, a first HARQ-ACK feedback time of HARQ-ACK information corresponding to the SPS PDSCH is slot n+2 (k=2), a maximum delay time (that is, a delay time) of the HARQ-ACK of the SPS PDSCH is $K_{Def}$=6. In other words, the HARQ-ACK information corresponding to the SPS PDSCH can be postponed to a slot n+2+6 at most for feedback.

In addition, a PUCCH cell timing pattern 1 and a PUCCH cell timing pattern 2 are configured on the network side. The PUCCH cell timing pattern 1 corresponds to a slot n to a slot n+4, and a PUCCH carrier available in the pattern 1 is CC3. The PUCCH cell timing pattern 2 corresponds to a slot n+3 to a slot n+7, and a PUCCH carrier available in the pattern 2 is CC2.

In this case, according to the foregoing method 0, the terminal begins to determine a transmission resource of the HARQ-ACK in the slot n+2. Because the slot n+2 is in the PUCCH cell timing pattern 1, the terminal searches for an available UL resource on a corresponding available PUCCH carrier 3. Because there are no available UL resources in the slot n+2 on the CC3, the terminal continues to search for available UL resources in the slot n+3. In the slot n+3, the available PUCCH carriers include the CC3 corresponding to the PUCCH cell timing pattern 1 and the CC2 corresponding to the PUCCH cell timing pattern 2. According to ascending order of carrier numbers, the terminal searches for UL resources on the CC2 corresponding to the PUCCH cell timing pattern 2 and the CC3 corresponding to the PUCCH cell timing pattern 1 respectively. Because there are no available UL resources for the CC2 and the CC3 in the slot n+3, the terminal continues to search for available UL resources in the slot n+4 Similarly, the available PUCCH carriers corresponding to the slot n+4 include the CC2 corresponding to the PUCCH cell timing pattern 2 and the CC3 corresponding to the PUCCH cell timing pattern 1 of the terminal.

If the terminal determines that the slot n+4 is an available UL resource on the CC2, the HARQ-ACK information can be transmitted based on the available UL resource.

Example 6

Figure 4F:
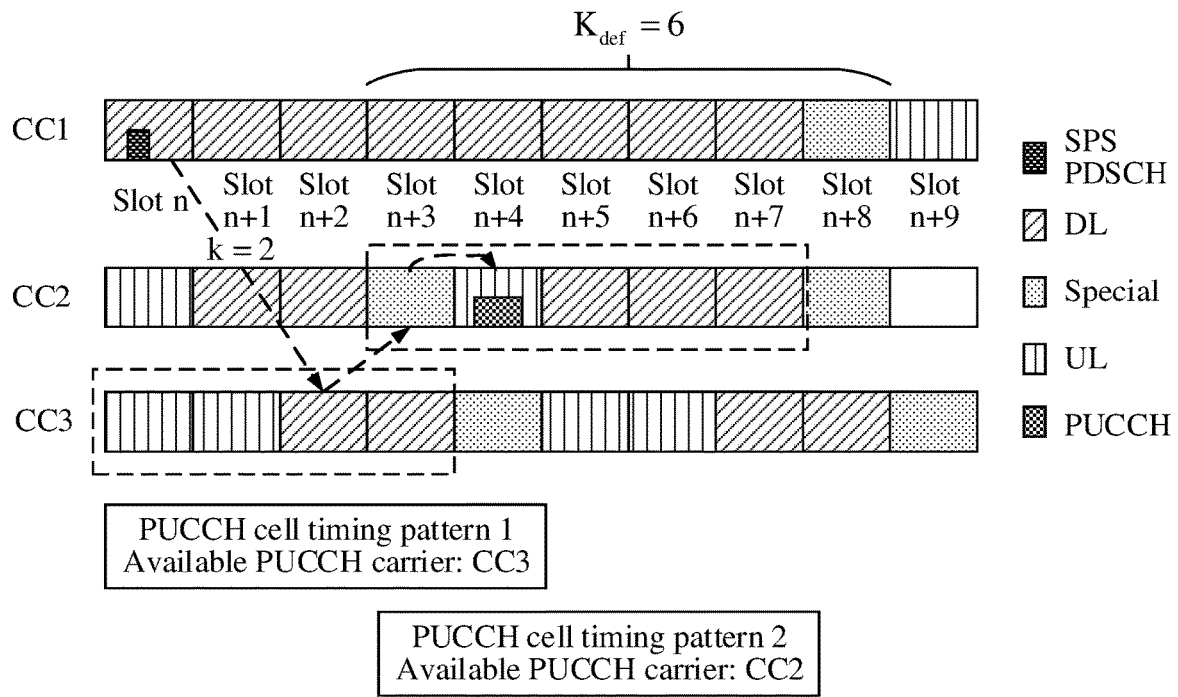

As shown in FIG. 4f, assuming that the terminal receives an SPS PDSCH sent by the network side device on a carrier 1 (CC1) in a slot n, and according to a network indication, a first HARQ-ACK feedback time of HARQ-ACK information corresponding to the SPS PDSCH is slot n+2 (k=2), a maximum delay time (that is, a delay time) of the HARQ-ACK of the SPS PDSCH is $K_{Def}$=6. In other words, the HARQ-ACK information corresponding to the SPS PDSCH can be postponed to a slot n+2+6 at most for feedback.

In addition, a PUCCH cell timing pattern 1 and a PUCCH cell timing pattern 2 are configured on the network side. The PUCCH cell timing pattern 1 corresponds to a slot n to a slot n+4, and a PUCCH carrier available in the pattern 1 is CC3. The PUCCH cell timing pattern 2 corresponds to a slot n+3 to a slot n+7, and a PUCCH carrier available in the pattern 2 is CC2.

In this case, according to the foregoing method 0, the terminal begins to determine the second HARQ-ACK feedback resource in the slot n+2. Because the slot n+2 is in the PUCCH cell timing pattern 1, the terminal searches for an available UL resource on a corresponding available PUCCH carrier 3. Because there are no available UL resources in the slot n+2 on the CC3, the terminal continues to search for available UL resources in the slot n+3.

In the slot n+3, the available PUCCH carriers include the CC3 corresponding to the PUCCH cell timing pattern 1 and the CC2 corresponding to the PUCCH cell timing pattern 2. The terminal first searches for UL resources on the CC2 corresponding to the PUCCH cell timing pattern 2. Because there are no available UL resources for the CC2 in the slot n+3, the terminal continues to search for available UL resources in the slot n+4.

Finally, if the terminal determines that the slot n+4 is an available UL resource on the CC2, the HARQ-ACK information can be transmitted based on the available UL resource.

Example 7

Figure 4G:
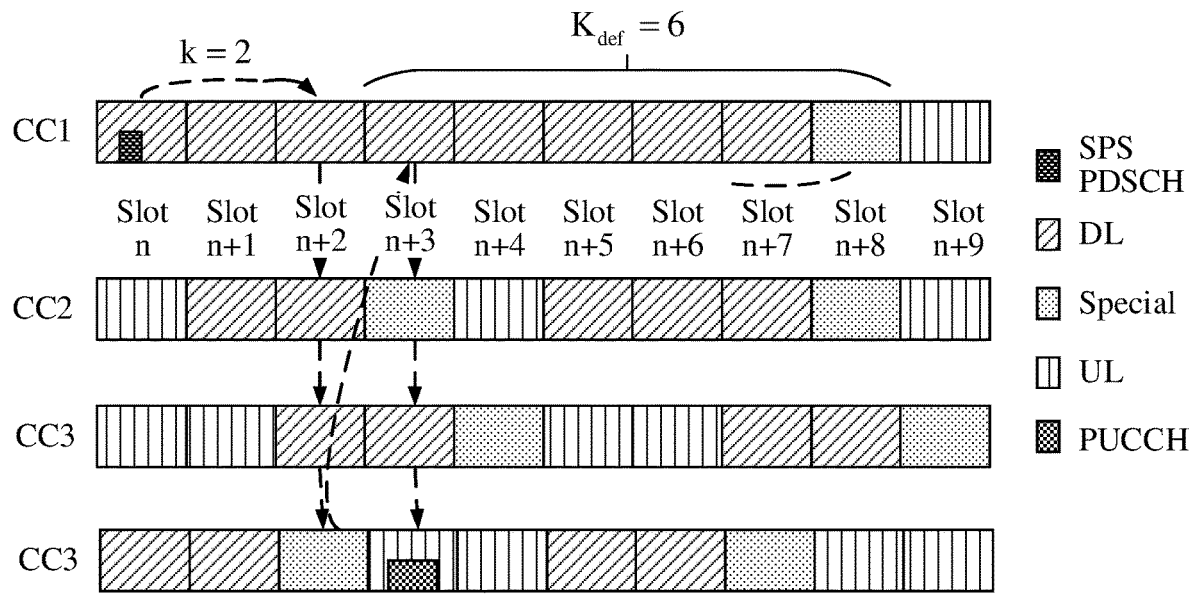

As shown in FIG. 4g, assuming that the terminal receives an SPS PDSCH sent by the network side device on a carrier 1 (CC1) in a slot n, and according to a network indication (for example, activated DCI), a first HARQ-ACK feedback time of HARQ-ACK information corresponding to the SPS PDSCH is slot n+2 (k=2), a maximum delay time (that is, a delay time) of the HARQ-ACK of the SPS PDSCH is $K_{Def}$=6. In other words, the HARQ-ACK information corresponding to the SPS PDSCH can be postponed to a slot n+2+6 at most for feedback.

However, because the CC1 conflicts with the DL resource in the slot n+2, the terminal re-determines the UL resource for HARQ-ACK information transmission. The CC1 to the CC4 are all uplink carriers equipped with PUCCH resources.

Based on this, according to the foregoing method 1, the terminal may search for available UL resources for all uplink carriers equipped with PUCCH resources in the current slot n+2. Because there are no available UL resources for the CC1 to the CC4 in the slot n+2, the terminal searches for available UL resources starting from the slot n+3 (in ascending order of time).

Finally, if the terminal determines that the slot n+3 of the CC4 is an available UL resource (namely, the second HARQ-ACK feedback resource), the HARQ-ACK information can be transmitted based on the slot n+3 of the CC4.

Figure 5:
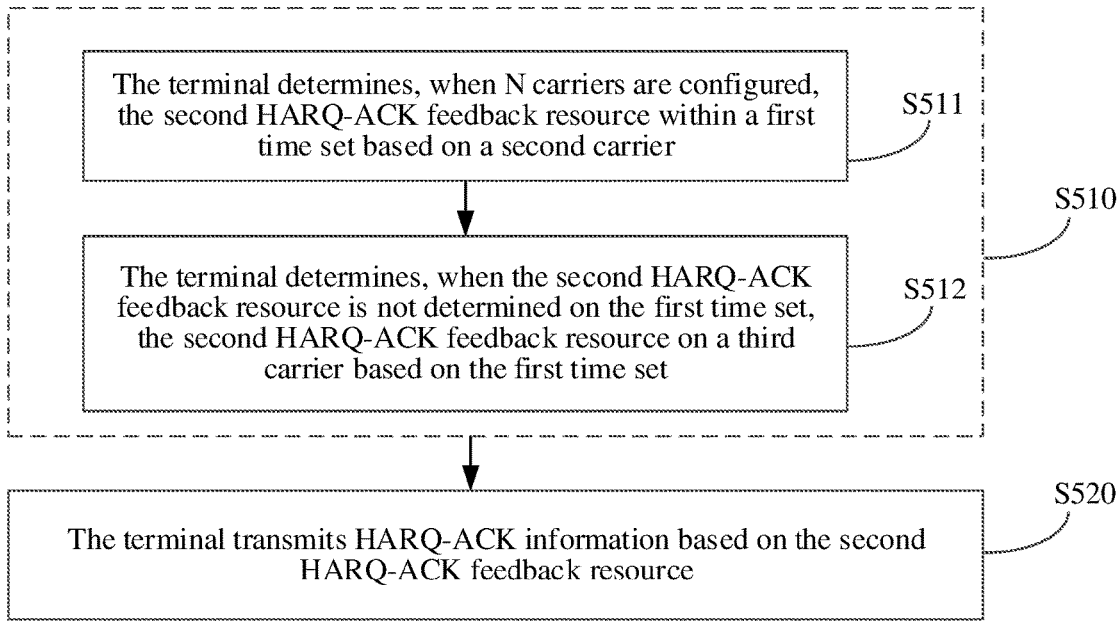
FIG. 5 is a schematic flowchart of a method for feeding back HARQ-ACK information according to another example embodiment of this application.

FIG. 5 is a schematic flowchart of a method 500 for feeding back HARQ-ACK information according to an example embodiment of this application. The method 500 may be, but is not limited to, performed by a terminal, and specifically may be performed by hardware and/or software installed in the terminal. In this embodiment, the method 500 may include at least the following steps.

S510: A terminal determines, when N carriers are configured, a second HARQ-ACK feedback resource based on a first HARQ-ACK feedback resource and the N carriers.

N≥2, and N is an integer.

It may be understood that for the implementation process of S510, in addition to referring to the relevant description in the method embodiment 200 and/or 300, in a possible implementation, the terminal may determine the second HARQ-ACK feedback resource based on the first HARQ-ACK feedback resource and the N carriers in various manners. For example, refer to FIG. 5 again. The implementation process of S510 may further include S511 and S512, as follows.

S511: The terminal determines, when N carriers are configured, the second HARQ-ACK feedback resource within a first time set based on a second carrier.

The first time set may be determined according to the first HARQ-ACK feedback resource. For example, in this embodiment, the first time set may include at least one third time, the third time is the first HARQ-ACK feedback time or any time after the first HARQ-ACK feedback time, and the first HARQ-ACK feedback time belongs to the first HARQ-ACK feedback resource.

For example, assuming that the first HARQ-ACK feedback time is a time unit j determined based on activated DCI, the third time may be a time unit j+1, a time unit j+2, a time unit j+3, a time unit j+4, . . . , and so on. In other words, the first time set may include the time unit j+1, the time unit j+2, the time unit j+3, the time unit j+4, . . . , and so on.

Further, in this embodiment, the second carrier belongs to the N carriers, for example, the first carrier may be any one of the N carriers. Optionally, in this embodiment, the second carrier may include at least one of the following (31) to (37).

(31) A carrier with the smallest number in the N carriers.
(32) A carrier with the highest number in the N carriers.
(33) A carrier determined based on a PUCCH cell timing pattern.
(34) A carrier that receives a PDSCH, where the PDSCH corresponds to the HARQ-ACK information.
(35) An uplink transmission carrier indicated by DCI.
(36) A main carrier.
(37) A subcarrier.

For an implementation process of (31) to (37), refer to the relevant descriptions in (11) to (17) above. To avoid repetition, details are not described herein again.

It should be noted that when the terminal determines the second HARQ-ACK feedback resource in the first time set, the terminal may sequentially determine the second HARQ-ACK feedback resource on the second carrier in order of the plurality of third times included in the first time set.

S512: The terminal determines, when the second HARQ-ACK feedback resource is not determined on the first time set, the second HARQ-ACK feedback resource on a third carrier based on the first time set, where the third carrier belongs to the N carriers, and the third carrier is different from the second carrier. For example, the N carriers include carriers (CC) 1, CC2, CC3, and CC4. When the first carrier is the CC1, the third carrier may be any other carrier except the CC1, for example, the CC2, the CC3, or the CC4.

Similar to the foregoing method embodiments, to improve communication efficiency, the maximum delay time $K_{Def}$ may be set through protocol agreement, high-level configuration, or the like. In this case, if the terminal does not find the second HARQ-ACK feedback resource on the second carrier based on the first time set, that is, slot (n+k) to slot (n+k+$K_{def}$), the terminal can exclude the second carrier and continue to reselect the second carrier (namely, the third carrier) in ascending or descending order of carriers for determining the second HARQ-ACK feedback resource.

Based on the foregoing descriptions of S511 and S512, the following describes the process of determining the second HARQ-ACK feedback resource by the terminal on the second carrier in combination with Method 2.

Method 2

(1) The terminal selects the second carrier in N carriers, searches for an available UL resource on the second carrier starting from the slot j (n+k) in the first time set and ending in the slot (n+k+$K_{def}$), and determines the searched available UL resource as a feedback resource for the HARQ-ACK information (namely, the second HARQ-ACK feedback resource).

(2) If the terminal does not find an available UL resource on the second carrier, that is, the terminal does not find an available UL resource within the slot j to the slot j+$K_{def}$, the second carrier is excluded. The terminal may re-determine the second carrier (namely, the third carrier in S512) in the N carriers in ascending or descending order, and based on the re-determined second carrier, repeat the foregoing (1) until an available UL resource is found.

S520: The terminal transmits HARQ-ACK information based on the second HARQ-ACK feedback resource.

It may be understood that for the implementation process of S520, refer to the relevant descriptions in the method embodiment 200 and/or 300. To avoid duplication, details are not described herein again.

Based on the method for feeding back HARQ-ACK information provided in this embodiment, such as the foregoing method 2, the implementation process is further described below with examples.

Example 1

Figure 6:
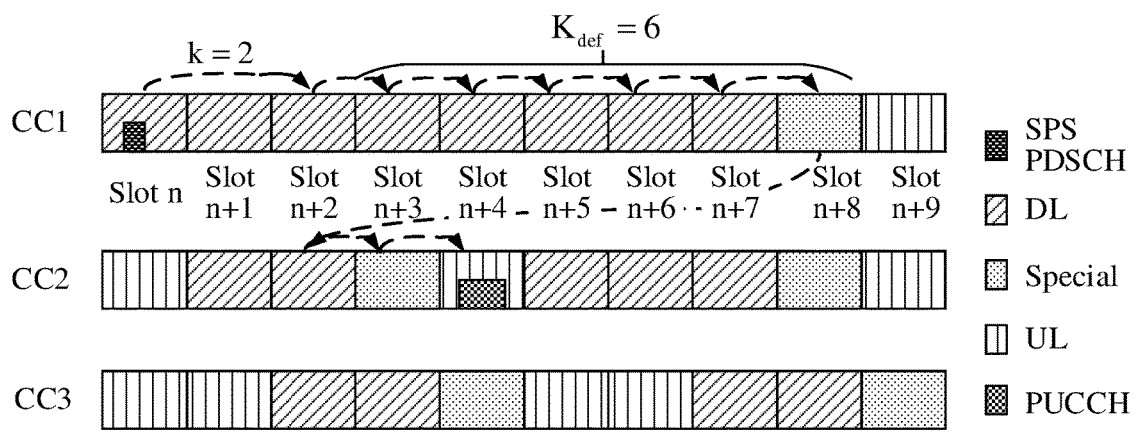
FIG. 6 is a schematic diagram of different slot structures for feeding back HARQ-ACK information according to another example embodiment of this application.

As shown in FIG. 6, assuming that the terminal receives an SPS PDSCH sent by the network side device on a carrier 1 (CC1) in a slot n, and according to a network indication (for example, activated DCI), a first HARQ-ACK feedback time of HARQ-ACK information corresponding to the SPS PDSCH is slot n+2 (k=2), a maximum delay time (that is, a delay time) of the HARQ-ACK of the SPS PDSCH is $K_{Def}$=6. In other words, the HARQ-ACK information corresponding to the SPS PDSCH can be postponed to a slot n+2+6 at most for feedback.

However, because the slot n+2 conflicts with the DL resource, the terminal postpones the HARQ-ACK to subsequent UL resources for feedback.

Specifically, according to the foregoing method 2, the terminal may search for subsequent available UL resources on a carrier with the smallest number. Because there are no available UL resources from the slot n+2 to the slot n+8 on the CC1, the terminal begins to search for available UL resources starting from the CC2 (in ascending order).

If the terminal determines an available UL resource (namely, the second HARQ-ACK feedback resource) in the slot n+4 of the CC2, HARQ-ACK information transmission can be performed based on the available UL resource.

Example 2

Still referring to FIG. 4c, assuming that the terminal receives an SPS PDSCH sent by the network side device on a carrier 1 (CC1) in a slot n, and according to a network indication, a first HARQ-ACK feedback time of HARQ-ACK information corresponding to the SPS PDSCH is slot n+2 (k=2), a maximum delay time (that is, a delay time) of the HARQ-ACK of the SPS PDSCH is $K_{Def}$=6. In other words, the HARQ-ACK information corresponding to the SPS PDSCH can be postponed to a slot n+2+6 at most for feedback.

However, because the slot n+2 conflicts with the DL resource, according to the foregoing method 2, the terminal postpones the HARQ-ACK information to subsequent UL resources. Based on this, the terminal can search for subsequent available UL resources on the current carrier. If it is determined that the slot n+4 is an available UL resource, the terminal transmits the HARQ-ACK information in the slot n+4.

Example 3

As shown in FIG. 4d, assuming that the terminal receives an SPS PDSCH sent by the network side device on a carrier 1 (CC1) in a slot n, and according to a network indication, a first HARQ-ACK feedback time of HARQ-ACK information corresponding to the SPS PDSCH is slot n+2 (k=2), a maximum delay time (that is, a delay time) of the HARQ-ACK of the SPS PDSCH is $K_{Def}$=6. In other words, the HARQ-ACK information corresponding to the SPS PDSCH can be postponed to a slot n+2+6 at most for feedback.

However, because the CC1 conflicts with the DL resource in the slot n+2, the UE re-determines the UL resource for HARQ-ACK information transmission.

Based on this, the network schedules the PUCCH in the slot n+5 of the CC3 through DCI in the slot 3. The PUCCH includes the HARQ-ACK information of the dynamically scheduled PDSCH. According to the foregoing method 2, the terminal may search for subsequent available UL resources on the CC1 (where the CC1 may be an SPS PDSCH receiving carrier, or a carrier corresponding to the PUCCH cell timing pattern, and this is not limited herein). There is no available UL resource in the slot n+2 to the slot n+4. Therefore, if the terminal is in the slot n+5, the CC3 indicated by DCI is switched to, and the slot n+5 is determined as an available UL resource. In this case, the HARQ-ACK information can be transmitted based on the available UL resource.

It should be noted that, for the method 200, 300 or 500 for feeding back HARQ-ACK information provided in embodiments of this application, the execution subject may be an apparatus for feeding back HARQ-ACK information, or a control module configured to perform the method 200, 300 or 500 for feeding back HARQ-ACK information in the apparatus for feeding back HARQ-ACK information. In this embodiment of this application, the apparatus for feeding back HARQ-ACK information provided in embodiments of this application is described by taking the method 200, 300 or 500 for feeding back HARQ-ACK information performed by the apparatus for feeding back HARQ-ACK information as an example.

Figure 7:
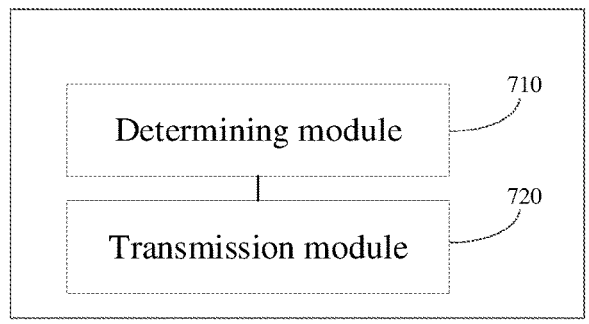
FIG. 7 is a schematic structural diagram of an apparatus for feeding back HARQ-ACK information according to an example embodiment of this application.

FIG. 7 is a schematic structural diagram of an apparatus 700 for feeding back HARQ-ACK information according to an example embodiment of this application. The apparatus 700 includes: a determining module 710, configured to determine, when N carriers are configured, a second HARQ-ACK feedback resource based on a first HARQ-ACK feedback resource and the N carriers; and a transmission module 720, configured to transmit HARQ-ACK information based on the second HARQ-ACK feedback resource, where the first HARQ-ACK feedback resource is determined according to a network indication, N≥2, and N is an integer.

Optionally, the determining module 710 is configured to determine, when the first HARQ-ACK feedback resource conflicts with a downlink DL resource of the N carriers, the second HARQ-ACK feedback resource based on the first HARQ-ACK feedback resource and a UL resource on the N carriers.

Optionally, the determining module 710 is configured to perform at least one of the following: determine, based on a first time, the second HARQ-ACK feedback resource on a first carrier or a first carrier set; and determine, based on a second carrier, the second HARQ-ACK feedback resource within a first time set, where the first time and/or the first time set is determined based on the first HARQ-ACK feedback resource, and both the first carrier and the second carrier belong to the N carriers.

Optionally, the determining module 710 is configured to sequentially determine the second HARQ-ACK feedback resource on each carrier included in the first carrier set according to a number sequence of each carrier included in the first carrier set.

Optionally, the determining module 710 is further configured to determine, when the second HARQ-ACK feedback resource is not determined on the first carrier or the first carrier set, the second HARQ-ACK feedback resource on the first carrier or the first carrier set based on a second time, where the second time is later than the first time.

Optionally, the second time is determined based on a maximum delay time.

Optionally, the first time includes a first HARQ-ACK feedback time or any time after the first HARQ-ACK feedback time, and the first HARQ-ACK feedback time belongs to the first HARQ-ACK feedback resource.

Optionally, the first carrier includes at least one of the following: a carrier with the smallest number in the N carriers; a carrier with the highest number in the N carriers; a carrier determined based on a physical uplink control channel PUCCH cell timing pattern; a carrier that receives a physical downlink shared channel PDSCH, where the PDSCH corresponds to the HARQ-ACK information; an uplink transmission carrier of the network indication; a main carrier; and a subcarrier.

Optionally, the first carrier set includes at least one of the following: at least some of the N carriers; a carrier determined based on a PUCCH cell timing pattern; a carrier that receives a PDSCH, where the PDSCH corresponds to the HARQ-ACK information; an uplink transmission carrier indicated by DCI; a main carrier; and a subcarrier.

Optionally, the determining module 710 is further configured to determine, when the second HARQ-ACK feedback resource is not determined on the first time set, the second HARQ-ACK feedback resource on a third carrier based on the first time set, where the third carrier belongs to the N carriers, and the third carrier is different from the second carrier.

Optionally, the first time set includes at least one third time, the third time is the first HARQ-ACK feedback time or any time after the first HARQ-ACK feedback time, and the first HARQ-ACK feedback time belongs to the first HARQ-ACK feedback resource.

Optionally, the second carrier includes at least one of the following: a carrier with the smallest number in the N carriers; a carrier with the highest number in the N carriers; a carrier determined based on a PUCCH cell timing pattern; a carrier that receives a PDSCH, where the PDSCH corresponds to the HARQ-ACK information; an uplink transmission carrier indicated by DCI; a main carrier; and a subcarrier.

In this embodiment, the method of determining the second HARQ-ACK feedback resource based on the first HARQ-ACK feedback resource and the N carriers achieves the purpose of reselecting the HARQ-ACK feedback resource on the N carriers, and then the HARQ-ACK information can be transmitted based on the reselected HARQ-ACK feedback resource. This not only effectively avoids the problem that the HARQ-ACK information is discarded due to the conflict between the HARQ-ACK feedback resource and the DL resource, but also improves the performance of the SPS PDSCH and the utilization of the UL resource on the N carriers.

The apparatus 700 for feeding back HARQ-ACK information in this embodiment of this application may be an apparatus, an apparatus with an operating system or an electronic device, or may be a component, an integrated circuit, or a chip in a terminal. The apparatus or electronic device may be a mobile terminal or may be a non-mobile terminal. For example, the mobile terminal may include, but is not limited to, the types of the terminal 11 listed above, and the non-mobile terminal may be a server, a network attached storage (NAS), a personal computer (PC), a television (TV), a teller machine, a self-service machine, or the like. This is not specifically limited in this embodiment of this application.

The apparatus 700 for feeding back HARQ-ACK information provided in the embodiments of this application can implement the processes implemented in the method embodiment of FIG. 2 to FIG. 6, and achieve the same technical effects. To avoid repetition, details are not described herein again.

An embodiment of this application further provides a terminal, including a processor and a communication interface. The communication interface is coupled to the processor. The processor is configured to run a program or instructions to implement the processes described in the method embodiment 200 or 300 or 500. This terminal embodiment corresponds to the foregoing terminal-side method embodiment. Each implementation process and implementation of the foregoing method embodiment can be applied to this terminal embodiment, and can achieve the same technical effects. Specifically, FIG. 7 is a schematic structural diagram of hardware of a terminal according to an embodiment of this application.

The terminal 800 includes, but is not limited to, at least some components such as a radio frequency unit 801, a network module 802, an audio output unit 803, an input unit 804, a sensor 805, a display unit 806, a user input unit 807, an interface unit 808, a memory 809, and a processor 810.

Figure 8:
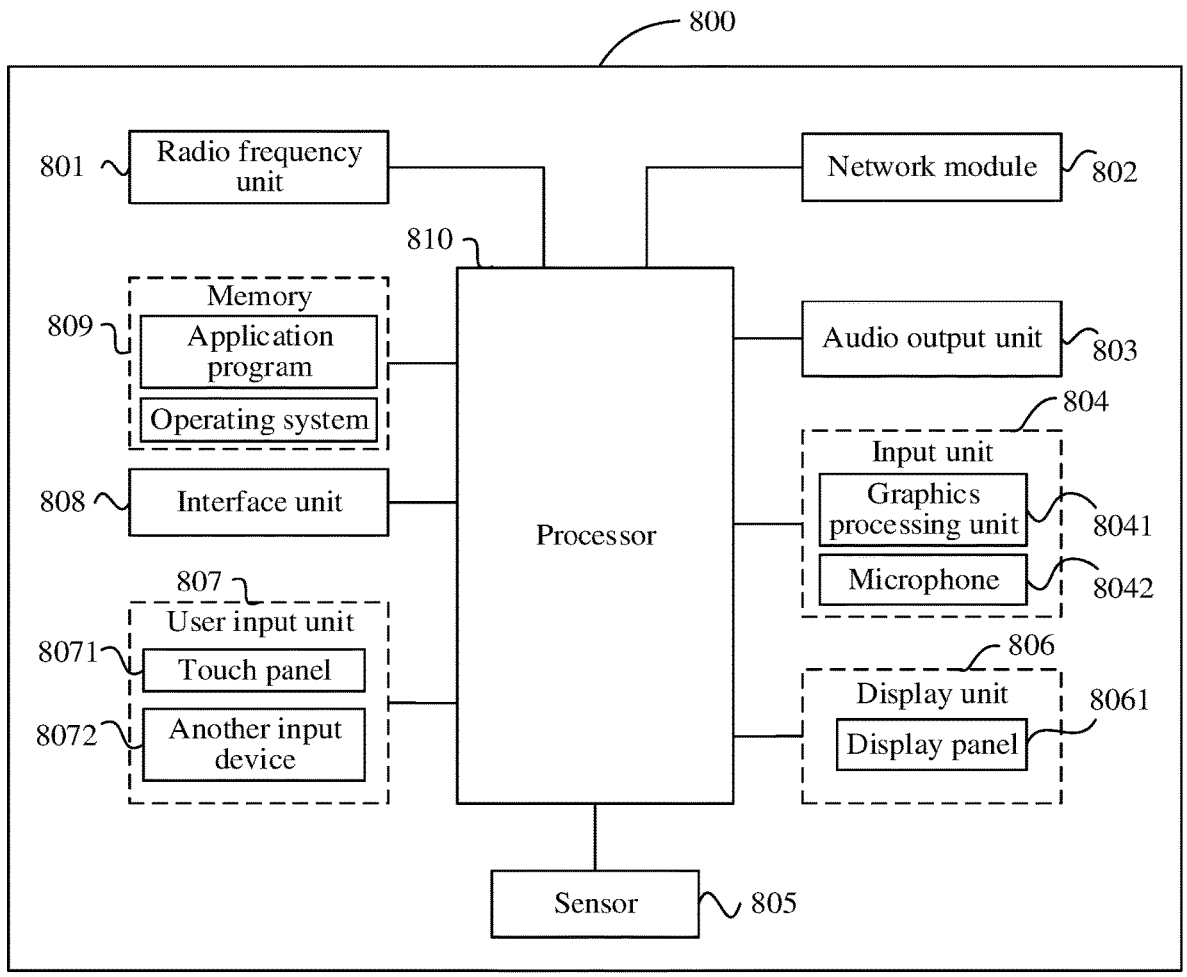
FIG. 8 is a schematic structural diagram of a terminal according to an example embodiment of this application.

A person skilled in the art may understand that the terminal 800 may further include the power supply (for example, a battery) for supplying power to the components. The power supply may be logically connected to the processor 810 by using a power management system, thereby implementing functions such as charging, discharging, and power consumption management by using the power management system. A terminal structure shown in FIG. 8 does not constitute a limitation to the terminal, and the terminal may include more or fewer components than those shown in the figure, or some components may be combined, or a different component deployment may be used. Details are not described herein again.

It should be understood that in embodiments of this application, the input unit 804 may include a graphics processing unit (GPU) 8041 and a microphone 8042, and the graphics processing unit 8041 processes image data of still images or videos obtained by an image capture apparatus (for example, a camera) in a video capture mode or an image capture mode. The display unit 806 may include a display panel 8061, and the display panel 8061 may be configured in a form such as a liquid crystal display or an organic light-emitting diode. The user input unit 807 includes a touch panel 8071 and another input device 8072. The touch panel 8071 is also referred to as a touchscreen. The touch panel 8071 may include two parts: a touch detection apparatus and a touch controller. The another input device 8072 may include, but is not limited to, a physical keyboard, a functional key (for example, a volume control key or a switch key), a track ball, a mouse, and a joystick, which are not repeated herein.

In this embodiment of this application, after the radio frequency unit 801 receives downlink data from a network side device, the downlink data is processed by the processor 810. In addition, uplink data is sent to the network side device. Generally, the radio frequency unit 801 includes, but is not limited to, an antenna, at least one amplifier, a transceiver, a coupler, a low noise amplifier, a duplexer, and the like.

The memory 809 may be configured to store software programs or instructions, and various pieces of data. The memory 809 may mainly include a program or instruction storage area and a data storage area. The program or instruction storage area may store an operating system, an application program or instruction required by at least one function (for example, a sound playing function and an image playing function), or the like. In addition, the memory 809 may include a high speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The memory may include, for example, at least one magnetic disk storage device, a flash memory, or other volatile solid-state storage devices.

The processor 810 may include one or more processing units. Optionally, the processor 810 may integrate an application processor and a modem processor. The application processor mainly processes an operating system, a user interface, an application program, instructions, and the like. The modem processor mainly processes wireless communication, and may be, for example, a baseband processor. It may be understood that the foregoing modem processor may either not be integrated into the processor 810.

The processor 810 is configured to determine, when N carriers are configured, a second HARQ-ACK feedback resource based on a first HARQ-ACK feedback resource and the N carriers; and the radio frequency unit 801 is configured to transmit HARQ-ACK information based on the second HARQ-ACK feedback resource, where the first HARQ-ACK feedback resource is determined according to a network indication, $N \geq 2$, and N is an integer.

Optionally, the processor 810 is configured to determine, when the first HARQ-ACK feedback resource conflicts with a downlink DL resource of the N carriers, the second HARQ-ACK feedback resource based on the first HARQ-ACK feedback resource and a UL resource on the N carriers.

Optionally, the processor 810 is configured to perform at least one of the following: determine, based on a first time, the second HARQ-ACK feedback resource on a first carrier or a first carrier set; and determine, based on a second carrier, the second HARQ-ACK feedback resource within a first time set, where the first time and/or the first time set is determined based on the first HARQ-ACK feedback resource, and both the first carrier and the second carrier belong to the N carriers.

Optionally, the processor 810 is configured to sequentially determine the second HARQ-ACK feedback resource on each carrier included in the first carrier set according to a number sequence of each carrier included in the first carrier set.

Optionally, the processor 810 is further configured to determine, when the second HARQ-ACK feedback resource is not determined on the first carrier or the first carrier set, the second HARQ-ACK feedback resource on the first carrier or the first carrier set based on a second time, where the second time is later than the first time.

Optionally, the second time is determined based on a maximum delay time.

Optionally, the first time includes a first HARQ-ACK feedback time or any time after the first HARQ-ACK feedback time, and the first HARQ-ACK feedback time belongs to the first HARQ-ACK feedback resource.

Optionally, the first carrier includes at least one of the following: a carrier with the smallest number in the N carriers; a carrier with the highest number in the N carriers; a carrier determined based on a physical uplink control channel PUCCH cell timing pattern; a carrier that receives a physical downlink shared channel PDSCH, where the PDSCH corresponds to the HARQ-ACK information; an uplink transmission carrier of the network indication; a main carrier; and a subcarrier.

Optionally, the first carrier set includes at least one of the following: at least some of the N carriers; a carrier determined based on a PUCCH cell timing pattern; a carrier that receives a PDSCH, where the PDSCH corresponds to the HARQ-ACK information; an uplink transmission carrier indicated by DCI; a main carrier; and a subcarrier.

Optionally, the processor 810 is further configured to determine, when the second HARQ-ACK feedback resource is not determined on the first time set, the second HARQ-ACK feedback resource on a third carrier based on the first time set, where the third carrier belongs to the N carriers, and the third carrier is different from the second carrier.

Optionally, the first time set includes at least one third time, the third time is the first HARQ-ACK feedback time or any time after the first HARQ-ACK feedback time, and the first HARQ-ACK feedback time belongs to the first HARQ-ACK feedback resource.

Optionally, the second carrier includes at least one of the following: a carrier with the smallest number in the N carriers; a carrier with the highest number in the N carriers; a carrier determined based on a PUCCH cell timing pattern; a carrier that receives a PDSCH, where the PDSCH corresponds to the HARQ-ACK information; an uplink transmission carrier indicated by DCI; a main carrier; and a subcarrier.

In this embodiment, the method of determining the second HARQ-ACK feedback resource based on the first HARQ-ACK feedback resource and the N carriers by the terminal achieves the purpose of reselecting the HARQ-ACK feedback resource on the N carriers, and then the HARQ-ACK information can be transmitted by the terminal based on the reselected HARQ-ACK feedback resource. This not only effectively avoids the problem that the HARQ-ACK information is discarded due to the conflict between the HARQ-ACK feedback resource and the DL resource, but also improves the performance of the SPS PDSCH and the utilization of the UL resource on the N carriers.

An embodiment of this application further provides a non-transitory readable storage medium, storing a program or instructions, the program or the instructions, when executed by a processor, implementing the processes of the foregoing embodiments of the method for feeding back HARQ-ACK information and achieving the same technical effects, which is not described herein again to avoid repetition.

The processor is the processor in the terminal described in the foregoing embodiment. The non-transitory readable storage medium includes a non-transitory computer-readable storage medium, and is, for example, a computer read-only memory (ROM).

An embodiment of this application further provides a chip, where the chip includes a processor and a communication interface, the communication interface is coupled to the processor, and the processor is configured to run a program or instructions of a network side device, to implement the processes of the foregoing embodiments of the method for feeding back HARQ-ACK information and achieve the same technical effects, which is not described herein again to avoid repetition.

It should be understood that the chip described in embodiments of this application may also be referred to as a system-level chip, a system chip, a chip system, a system-on-chip chip, or the like.

An embodiment of this application further provides a computer program product, including a processor, a memory, and a program or instructions stored in the memory and executable on the processor, where the program or the instructions, when executed by the processor, implement the processes of the embodiments of the method for feeding back HARQ-ACK information, and can achieve the same technical effects. To avoid repetition, details are not described herein again.

An embodiment of this application further provides an electronic device, where the electronic device is configured to implement the processes of the foregoing embodiments of the method for feeding back HARQ-ACK information, and achieve the same technical effects. To avoid repetition, details are not described herein again.

It should be noted that the term "include", "include" or any other variation thereof in this specification is intended to cover a non-exclusive inclusion, which specifies the presence of stated processes, methods, objects, or apparatuses, but does not preclude the presence or addition of one or more other processes, methods, objects, or apparatuses. Without more limitations, elements defined by the sentence "including one" does not exclude that there are still other same elements in the processes, methods, objects, or apparatuses. Further, it should be noted that the scope of the method and the apparatus in the implementations of this application is not limited to performing the functions in the order shown or discussed, but may further include performing the functions in a substantially simultaneous manner or in the reverse order depending on the functions involved. For example, the described method may be performed in an order different from that described, and various steps may be further added, omitted, or combined. In addition, features described with reference to some examples may be combined in other examples.

Through the descriptions of the foregoing implementations, a person skilled in the art may clearly understand that the methods in the foregoing embodiments may be implemented via software and a necessary general hardware platform, and certainly, may also be implemented by hardware, but in many cases, the former manner is a better implementation. Based on such an understanding, the technical solutions of this application essentially or the part contributing to the prior art may be implemented in a form of a computer software product. The computer software product is stored in a storage medium (for example, a ROM/RAM, a magnetic disk, or an optical disc) and includes several instructions for instructing a terminal (which may be a mobile phone, a computer, a server, an air conditioner, a network device, or the like) to perform the method described in embodiments of this application.

Embodiments of this application are described above with reference to the accompanying drawings. However, this application is not limited to the foregoing specific implementations. The foregoing specific implementations are illustrative instead of limitative. Enlightened by this application, a person of ordinary skill in the art can make many forms without departing from the idea of this application and the scope of protection of the claims. All of the forms fall within the protection of this application.

What is claimed is:

1. A method for feeding back HARQ-ACK information, comprising:
    determining, by a terminal, when N carriers are configured, a second hybrid automatic repeat request acknowledgement (HARQ-ACK) feedback resource based on a first HARQ-ACK feedback resource and the N carriers; and
    transmitting, by the terminal, HARQ-ACK information based on the second HARQ-ACK feedback resource,
    wherein
    the first HARQ-ACK feedback resource is determined according to a network indication, N≥2, and N is an integer;
    wherein the determining, by the terminal, the second HARQ-ACK feedback resource based on the first HARQ-ACK feedback resource and the N carriers comprises:
    determining, by the terminal, based on a first time, the second HARQ-ACK feedback resource on a first carrier set;

wherein the first time is determined based on the first HARQ-ACK feedback resource;

wherein the first time comprises a first HARQ-ACK feedback time or any time after the first HARQ-ACK feedback time, the first HARQ-ACK feedback time belongs to the first HARQ-ACK feedback resource, and the first carrier set is determined on the first time;

wherein after the determining, by the terminal, based on the first time, the second HARQ-ACK feedback resource on the first carrier set, the method further comprises:

determining, by the terminal, when the second HARQ-ACK feedback resource is not determined on the first carrier set, the second HARQ-ACK feedback resource on the first carrier set based on a second time, wherein the second time is later than the first time;

wherein that the second HARQ-ACK feedback resource is not determined on the first carrier set comprises: a HARQ-ACK resource determined on the first carrier set conflicts with a downlink (DL) resource.

2. The method according to claim 1, wherein the determining, by the terminal, the second HARQ-ACK feedback resource based on the first HARQ-ACK feedback resource and the N carriers comprises:

determining, by the terminal, when the first HARQ-ACK feedback resource conflicts with a downlink (DL) resource of the N carriers, the second HARQ-ACK feedback resource based on the first HARQ-ACK feedback resource and an uplink (UL) resource on the N carriers.

3. The method according to claim 1, wherein the determining, by the terminal, the second HARQ-ACK feedback resource based on the first HARQ-ACK feedback resource and the N carriers comprises:

determining, by the terminal, based on a second carrier, the second HARQ-ACK feedback resource within a first time set, wherein the first time set is determined based on the first HARQ-ACK feedback resource, and the second carrier belongs to the N carriers;

wherein the first time set comprises the first HARQ-ACK feedback time or any time after the first HARQ-ACK feedback time.

4. The method according to claim 3, wherein after the determining, by the terminal based on the second carrier, the second HARQ-ACK feedback resource within the first time set, the method further comprises:

determining, by the terminal, when the second HARQ-ACK feedback resource is not determined on the first time set, the second HARQ-ACK feedback resource on a third carrier based on the first time set, wherein the third carrier belongs to the N carriers, and the third carrier is different from the second carrier.

5. The method according to claim 1, wherein the determining the second HARQ-ACK feedback resource on the first carrier set comprises:

sequentially determining the second HARQ-ACK feedback resource on each carrier comprised in the first carrier set according to a number sequence of each carrier comprised in the first carrier set.

6. The method according to claim 1, wherein the second time is determined based on a maximum delay time.

7. The method according to claim 1, wherein the first carrier set comprises at least one of the following:

at least some of the N carriers;

a carrier determined based on a PUCCH cell timing pattern;

a carrier that receives a PDSCH, wherein the PDSCH corresponds to the HARQ-ACK information;

an uplink transmission carrier indicated by downlink control information (DCI);

a main carrier; and a subcarrier.

8. The method according to claim 1, wherein the method further comprises: stopping, by the terminal, when the second HARQ-ACK feedback resource is not determined on the first carrier set but the second time is later than the first time and reaches a maximum delay time, the step of determining the second HARQ-ACK feedback resource on the first carrier set.

9. A chip, comprising a processor and a communication interface, wherein the communication interface is coupled to the processor, and the processor is configured to run a program or instructions to implement the steps of the method according to claim 1.

10. A computer program product, stored in a storage medium, wherein the computer program product is executed by at least one processor to implement the steps of the method according to claim 1.

11. A terminal, comprising a processor, a memory, and a program or instructions stored in the memory and executable on the processor, wherein the program or the instructions, when executed by the processor, causes the terminal to perform:

determining, when N carriers are configured, a second hybrid automatic repeat request acknowledgement (HARQ-ACK) feedback resource based on a first HARQ-ACK feedback resource and the N carriers; and transmitting, HARQ-ACK information based on the second HARQ-ACK feedback resource, wherein the first HARQ-ACK feedback resource is determined according to a network indication, $N \geq 2$, and N is an integer;

wherein when determining the second HARQ-ACK feedback resource based on the first HARQ-ACK feedback resource and the N carriers, the program or the instructions, when executed by the processor, causes the terminal to perform:

determining, based on a first time, the second HARQ-ACK feedback resource on a first carrier set;

wherein the first time is determined based on the first HARQ-ACK feedback resource;

wherein the first time comprises a first HARQ-ACK feedback time or any time after the first HARQ-ACK feedback time, the first HARQ-ACK feedback time belongs to the first HARQ-ACK feedback resource, and the first carrier set is determined on the first time;

wherein after the determining, based on the first time, the second HARQ-ACK feedback resource on the first carrier set, the program or the instructions, when executed by the processor, causes the terminal to perform:

determining, when the second HARQ-ACK feedback resource is not determined on the first carrier set, the second HARQ-ACK feedback resource on the first carrier set based on a second time, wherein the second time is later than the first time;

wherein that the second HARQ-ACK feedback resource is not determined on the first carrier set comprises: a HARQ-ACK resource determined on the first carrier set conflicts with a downlink (DL) resource.

12. The terminal according to claim 11, wherein when determining; the second HARQ-ACK feedback resource based on the first HARQ-ACK feedback resource and the N carriers, the program or the instructions, when executed by the processor, causes the terminal to further perform:

determining, based on a second carrier, the second HARQ-ACK feedback resource within a first time set, wherein the first time set is determined based on the first HARQ-ACK feedback resource, and the second carrier belongs to the N carriers;

wherein the first time set comprises the first HARQ-ACK feedback time or any time after the first HARQ-ACK feedback time.

13. A non-transitory readable storage medium, storing a program or instructions, wherein the program or the instructions, when executed by a processor, causes the processor to perform:

determining, when N carriers are configured, a second hybrid automatic repeat request acknowledgement (HARQ-ACK) feedback resource based on a first HARQ-ACK feedback resource and the N carriers; and transmitting HARQ-ACK information based on the second HARQ-ACK feedback resource, wherein the first HARQ-ACK feedback resource is determined according to a network indication, N≥2, and N is an integer;

wherein when determining the second HARQ-ACK feedback resource based on the first HARQ-ACK feedback resource and the N carriers, the program or the instructions, when executed by the processor, causes the processor to perform:

determining, based on a first time, the second HARQ-ACK feedback resource on a first carrier set;

wherein the first time is determined based on the first HARQ-ACK feedback resource;

wherein the first time comprises a first HARQ-ACK feedback time or any time after the first HARQ-ACK feedback time, the first HARQ-ACK feedback time belongs to the first HARQ-ACK feedback resource, and the first carrier set is determined on the first time;

wherein after the determining, based on the first time, the second HARQ-ACK feedback resource on the first carrier set, the program or the instructions, when executed by the processor, causes the processor to perform:

determining, when the second HARQ-ACK feedback resource is not determined on the first carrier set, the second HARQ-ACK feedback resource on the first carrier set based on a second time, wherein the second time is later than the first time;

wherein that the second HARQ-ACK feedback resource is not determined on the first carrier set comprises: a HARQ-ACK resource determined on the first carrier set conflicts with a downlink (DL) resource.

* * * * *